United States Patent [19]

Makhkamov et al.

[11] 3,790,341

[45] Feb. 5, 1974

[54] METHOD OF DYEING POLYMERS CONTAINING NITRILE GROUPS AND ARTICLES MADE OF SAME

[76] Inventors: Kajum Makhkamov, ulitsa Zhdanova, 118, kv. 8; Iosif Yakubovich Kalontarov, Prospekt Kuibysheva, 4/1, kv. 15; Eleonora Nikolaevna Repina, ulitsa Sviridenko 34, kv. 7, all of Dushanbe, U.S.S.R.

[22] Filed: Jan. 12, 1970

[21] Appl. No.: 2,353

[52] U.S. Cl............................ 8/52, 8/21 A, 8/171, 81/128 R, 260/778, 260/79.3 R, 260/79.5 R, 260/17.4
[51] Int. Cl........................... D06p 1/00, D06p 3/82
[58] Field of Search. 8/21 A, 52, 171, 128; 260/778

[56] References Cited
UNITED STATES PATENTS 2,563,640  8/1964  Brown.............................. 260/79.5
2,563,662  8/1951  Rothrock.......................... 260/79.5
2,215,196  9/1940  Schlack............................ 8/29

Primary Examiner—George F. Lesmes
Assistant Examiner—Patricia C. Ives
Attorney, Agent, or Firm—Waters, Roditi, Schwartz and Nissen

[57] ABSTRACT

A method of dyeing polymers containing nitrile groups and articles made from such polymers so as to impart colors thereto ranging from yellow to brown, according to which sulfur is introduced into said polymers and articles made therefrom by treating them with an aqueous solution of hydrosulfuric acid or salts thereof in a neutral medium with a subsequent treatment of said polymers and articles in a weakly acidic medium. Further treatment with a metal salt capable of forming a chelate with the sulfhydryl groups in the dyed polymer imparts decay-resistance, light-fastness, thermal stability and hydrophobic properties.

12 Claims, No Drawings

METHOD OF DYEING POLYMERS CONTAINING NITRILE GROUPS AND ARTICLES MADE OF SAME

The present invention relates to the textile industry and more particularly to a method of dyeing polymers containing nitrile groups and articles made of such polymers.

Polymers containing nitrile groups are widely used for producing synthetic fibres, plastics and other products.

The term "polymers containing nitrile groups" is used to denote polyacrylonitrile and its derivatives, cyanoethylated derivatives of cellulose and polyvinyl alcohol, graft copolymers of cellulose, polyvinyl alcohol or polyamides with polyacrylonitrile. Said polymers or their mixtures with other polymers can be used for manufacturing various products.

Various methods are known of dyeing polymers that contain nitrile groups, by using different dyes, so that the resulting colors range from yellow to brown. Not all dyes, however, exhibit adequate fastness. Most fast colors are obtained when dyeing cyanoethylated cellulose or graft copolymers of cellulose and polyacrylonitrile with cationic or vat dyes. Cationic and vat dyes are quite costly and, besides, dyeing with the use of vat dyes is a complicated and lengthy process.

An object of the present invention is to provide a method of dyeing polymers containing nitrile groups with the resultant colors ranging from yellow to brown, which will ensure high stability of the colors, the dyeing process being simple and economically expedient as to its cost.

Another object of the present invention is to provide such a dyeing process, after which polymers containing nitrile groups will be not only colored, but will also feature an improved stability to solar and ultraviolet radiation, to the action of microorganisms, and have hydrophobic properties.

The essence of the method of the present invention resides in that sulfur is introduced into polymers containing nitrile groups or into articles made of such polymers, by treating them with an aqueous solution of hydrosulfuric acid or its salts in a neutral medium with a subsequent treatment in a weakly acidic medium.

As hydrosulfuric use should be made of sulfides of alkali metals or of ammonium sulfide. Sodium sulfide is preferable among sulfides of alkali metals.

Said polymers or articles made therefrom are treated with aqueous solutions of hydrosulfuric acid or its salts whose concentration should be not lower than 3 wt. percent. The concentration of aqueous solutions of hydrosulfuric acid or its salts is so selected, that, taking into account the content of nitrile groups in the polymers or in articles made therefrom, the content of sulfur in the polymers should be not less than 2.5 wt. percent for coloring them from yellow to orange, and not less than 8 wt. percent for the resulting colors to be from orange to brown. It is possible to obtain intermediate tones: yellow, golden-yellow, orange, red-brown, brown and dark brown.

A neutral medium with a pH = 7–7.5 when treating said polymers or articles made therefrom is maintained by introducing a required amount of a phosphate buffer; it is preferable to use monobasic potassium phosphate for such a buffer.

After treating polymers or articles made therefrom with aqueous solutions of hydrosulfuric acid or its salts, the polymers or articles are placed into a weakly acidic medium whose pH is maintained within 4–6. Said pH value is maintained by introducing a mineral acid, preferably sulfuric acid, using its 3 percent aqueous solution.

For imparting new properties to said polymers and articles made therefrom, namely, for making them decay-resistant, water-resistant and bactericidal, the polymers and articles produced from them, after sulfur has been introduced into them, that is, after they have been treated with aqueous solutions of hydrosulfuric acid or its salts and then in a weakly acidic meidum, are treated with aqueous solutions of salts of certain metals capable of forming a chelate compound with sulfhydryl groups. Salts of copper and nickel may be cited as an example. The formation of a chelate compound is accompanied by a change in the shade of the color of the material.

The present method of dyeing polymers containing nitrile groups, as well as articles made therefrom may be carried out either in a periodic cycle, or in a semi-continuous cycle.

In the first case the treatment with said sulfur-containing compounds is effected by heating to a temperature in the range of 60°–100° C, preferably from 70° to 80° C, for 30–360 min., preferably for 60 min. In the second case, that is, when the process is run according to a semi-continuous cycle, the treatment is carried out under the same temperature conditions, but for 0.5–10 min., preferably for 3–5 min., with a subsequent removal of excess impregnating solution and with steaming at a temperature of 100°–105° C for 1–20 min., preferably for 10 min.

When effecting the present method of dyeing in a periodic fashion, the introduction of sulfur into said polymer or into articles made therefrom is carried out by immersing them into an aqueous solution of hydrosulfuric acid or its salts with the pH = 7–7.5 maintained by an appropriate amount of a phosphate buffer. The treatment is continued from 30 min. to 6 hrs. The initial polymer material is colored differently, from yellow to brown, depending on the amount of sulfur introduced. The resulting chromophore system is an indispensable part of the polymer macromolecule, which fact results in a high fastness of the color. Said treatment can be carried out on any conventional periodic-action dyeing equipment adapted for dyeing fibres, yarn or fabric. After the treatment with the sulfur-containing compound, the solution is drained and the polymeric material is treated for 15 min. with a 3 percent aqueous solution of sulfuric acid. After said period the material is washed with water, wrung and dried.

The semi-continuous method consists of impregnating said polymer or article made therefrom with a concentrated solution of hydrosulfuric acid or its salts with the pH = 7–7.5 maintained by the introduction of an appropriate amount of a phosphate buffer, whereupon excess impregnating solution is removed, the material is steamed, kept in an acidic medium, washed and dried. The impregnation can be carried out on any equipment suitable for the purpose. The removal of excess impregnating solution from the material is effected by wringing or centrifuging. After the removal of excess solution the material is placed into a steaming chamber filled with steam at 100°–105° C. When dyeing fabrics, use may be made of an air-free ager or other chamber provided with means for moving the material in such a manner that the residence time of the material in the chamber should last for 0.5–30 min., preferably for 10 min. Then the material is subjected to other procedures, similar to those employed in the periodic process.

The stability of colors obtained according to the present invention is characterized by the test data for a specimen of fibre made of a copolymer of regenerated cellulose and polyacrylonitrile, which was colored golden-yellow. The data are presented in Table 1 to follow.

sulfuric acid at 20° C during 15 min.; then the specimen is washed with water and dried with hot air at a temperature of 80° C. The fabric acquires an intensively golden-yellow color with a reddish hue. The color is not removed from the specimen after extraction with an organic solvent, e.g., ethanol. The content of sulfur in the specimen amounts to 2.5–2.8 wt. percent.

EXAMPLE 2.

5 parts by weight of undelustred viscose fabric containing 27 wt. percent of grafted polyacrylonitrile are treated with an aqueous solution comprising 3 wt. per-

TABLE 1

| Distilled water (24 hr) | Solution of 3 g/l of soap and 5 g/l of soda (30 min.) at 40°C | at 100°C | "Sweat" (30 min.) | Friction | | Light | Weather resistance |
|---|---|---|---|---|---|---|---|
| | | | | dry | wet | | |
| 5/5/5 | 5/5/5 | 5/5/5 | 5/5/5 | 5 | 5 | 7–8 | 7 |

The fastness of colors tested for the effect of wet treatment and friction has been estimated in accordance with a five-point scale, light fastness and light weather characteristics have been estimated according to an eight-point scale.

As can be seen from Table 1, the color proves to be very stable to all kinds of action. The color intensity does not change after 15 hours of ultraviolet irradiation of the colored specimen by using a mercury-quartz lamp, the distance between the light source and the specimen being 35 cm.

One effect of the present invention consists in that the process of dyeing polymers containing nitrile groups, and articles made therefrom, becomes essentially cheaper by obviating the use of vat and cationic dyes and replacing them by cheap and easily available materials.

Another effect of the present invention consists in the obtaining of colors which prove to be very stable when subject to the action of such external factors as wet treatment, friction, light, light weather, ultraviolent irradiation, the polymers and articles made therefrom also acquring a number of new valuable properties from the standpoint of their future application.

The colors imparted to the polymers or to articles made therefrom do not deteriorate after repeated boiling in solutions of detergents or when subjected to extraction in organic solvents, such as ethanol, pyridine or chloroform, whereas vat and cationic dyes do become removed from colored materials after being subjected to extraction in said solvents.

For a better understanding of the present invention by those skilled in the art, given hereinbelow by way of illustration are examples of some particular embodiments of the method of dyeing polymers.

EXAMPLE 1.

Five parts by weight of undelustred viscose fabric containing 27 wt. percent of graft polyacrylonitrile are treated with a 5 percent aqueous solution of sodium sulfide at a temperature of 75° C during 1 hour, with the length of bath being 50 and pH = 7–7.5, maintained by the introduction of monobasic potassium phosphate. After the treatment the specimen is removed from the bath and washed with a 3 percent aqueous solution of cent of hydrogen sulfide. The process of treating the specimen is similar to that described in Example 1. The fabric acquires a golden-yellow color. The content of sulfur in the specimen is 3.0–3.5 wt. percent.

EXAMPLE 3.

A sample of fabric as in Example 1 is treated with a 20 percent aqueous solution of sodium sulfide, with the pH = 7–7.2 and temperature of 70° C, during 5 min. Said pH value is maintained by introducing monobasic potassium phosphate. After the elapse of said period of time the fabric is wrung to 100 percent gain in weight and steamed during 10 min. Then the specimen is treated with a 3 percent aqueous solution of sulfuric acid, washed with water, and dried. The content of sulfur in the specimen is 4.0–4.5 wt. percent.

EXAMPLE 4.

Polyvinyl alcohol is grafted with 20 percent of polyacrylonitrile (by weight of the polyvinyl alcohol). The resulting copolymer is washed and dried. 5 g of said copolymer are treated with an aqueous solution of sodium sulfide in the same manner as described in Example 1. The content of sulfur in the specimen was 3.0–3.5 wt. percent. The specimen acquires a golden-yellow color.

EXAMPLE 5.

5 parts by weight of "mtylon" (copolymer of cellulose and polyacrylonitrile grafted on viscose rayon) containing 42 wt. percent of graft polyacrylonitrile are treated in a 10 percent solution of sodium sulfide at a temperature of 73°–75° C for 2–2.5 hours at a pH = 7–7.5, maintained by introducing monobasic sodium phosphate, the length of bath being 50. After the treatment the specimen is removed from the bath and washed with a 3 percent solution of sulfuric acid at room temperature for 15 min., then washed with water and dried. The content of sulfur in the obtained specimen is 5.2–5.5 wt. percent. The color of the specimen is orange. The results of testing the color fastness of the given specimen when the latter has been subjected to the action of various agents are presented in Table 2, the values being given in points.

TABLE 2

| Distilled water | Soap and soda at 40°C | at 100°C | Sweat at 100°C | Friction wet | Friction dry | Weather |
|---|---|---|---|---|---|---|
| 5/5/5 | 5/5/5 | 5/5/5 | 5/5/5 | 5 | 5 | 7 |

EXAMPLE 6.

For obtaining saturated orange colors, a specimen of fabric made of a graft copolymer of cellulose or polyvinyl alcohol and polyacrylonitrile is treated under the conditions described in Example 5 for 5–6 hours with an 8% solution of sodium sulfide in a neutral medium. The content of sulfur is 5.2–6.0 wt. percent.

EXAMPLE 7.

For obtaining a red-brown color, a graft copolymer of polyvinyl alcohol and polyacrylonitrile, comprising 100 percent of graft polyacrylonitrile, is treated in an 8 percent solution of sodium sulfide at a temperature of 70°–75° C for 5 hours in a neutral medium, attained by introducing monobasic sodium or potassium phosphate, the length of bath being 50. After the treatment the specimen is washed with a 3 percent aqueous solution of sulfuric acid at room temperature for 15 min., then washed with water and dried. The content of sulfur is 9.2–9.5 wt. percent.

EXAMPLE 8.

Five parts by weight of "mtylon", comprising 40–42 percent of graft polyacrylonitrile, are treated with a 10 percent solution of sodium sulfide under the conditions of Example 5. Upon termination of said treatment the fibre is immersed into a 5 percent aqueous solution of cupric acetate at room temperature and with the length of bath 50 for 2 hours, then washed with cold water and dried. The content of copper in the specimen is 1.3–1.5 percent. The specimen is colored khaki with a brown hue. After washing the color deepens. The initial strength of the thread is 200 g/mm$^2$, after treating with polyacrylonitrile, sodium sulfide and cupric acetate it becomes 210.4 g/mm$^2$. After keeping the specimen during 192 hours in soil at a depth of 50 cm, the strength of the untreated thread is 24.8 g/mm$^2$, and that of the treated thread is 198 g/mm$^2$; in other words, almost 100 percent preservation of the fibre strength is observed. The obtained modified fibres feature a high light fastness. Given hereinbelow are pertinent comparative data which characterize the tensile strength of the thread which has been irradiated during 10 hours with a mercury-quartz lamp in air.

Residual strength (in per cent of the initial value):
1. Untreated fabric —67.3
2. Fabric treated with polyacrylonitrile, sodium sulfide and cupric acetate —98.2

Modified fibres feature bactericidal properties, the pertinent data being presented in Table 3.

TABLE 3

| Tested material | Bacterium coli commune | Spigel-la flexneri | Staphylococcus citreus | Staphylococcus aureus | Salmonella enteridis | Check |
|---|---|---|---|---|---|---|
| Untreated viscose fibre | + | + | + | + | + | + |
| Viscose fibre containing nitrite groups (treated with polyacrylonitrile) | 5 | x | x | x | 23 | + |
| Viscose fibre containing nitrile groups, treated with sodium sulfide | 6 | x | 20 | x | x | + |
| Viscose fibre containing nitrile groups, treated with sodium sulfide and cupric acetate | 15 | 12 | 22 | 24 | 20 | + |

The figures indicate the diameter in mm of delay in the growth of bacteria,
+ indicates growth
x stands for weakly positive The obtained fibre also exhibits hydrophobic properties.

The characteristics of the hydrophobic properties determined by the capillary rise method at multiple launderings are presented in Table 4.

TABLE 4

| Tested material | Time of measuring (min.) | Capillary rise in cm at 20°C | | | |
|---|---|---|---|---|---|
| | | Before laundering | After 1st laundering | After 2nd laundering | After 3rd laundering |
| Untreated fabric | 15 | 7.7 | 8.5 | 8.8 | 9.0 |
| | 30 | 9.7 | 10.2 | 10.5 | 10.8 |
| | 45 | 10.6 | 11.1 | 11.3 | 11.7 |
| | 60 | 11.0 | 11.9 | 12.0 | 12.2 |
| Fabric treated with polyacrylonitrile, sodium sulfide | 15 | 4.2 | 4.8 | 5.0 | 5.2 |
| | 30 | 6.6 | 6.7 | 7.0 | 7.3 |
| | 45 | 7.5 | 7.8 | 8.7 | 8.2 |
| | 60 | 8.5 | 8.7 | 9.2 | 9.6 |
| Fabric treated with polyacrylonitrile, sodium sulfide and cupric acetate | 15 | 0.0 | 0.5 | 2.1 | 3.0 |
| | 30 | 0.0 | 1.2 | 2.3 | 5.0 |
| | 45 | 0.0 | 1.5 | 2.4 | 6.0 |
| | 60 | 0.0 | 2.0 | 2.6 | 6.2 |

EXAMPLE 9.

Graft copolymer of polyvinyl alcohol and polyacrylonitrile containing 20 wt. percent of graft polyacrylonitrile is kept in an 8 percent aqueous solution of sodium sulfide at 73°–75° C for 1 hour in a neutral medium at pH = 7–7.5, maintained by the introduction of sodium phosphate, the length of bath being 50. After said period of time the specimen is washed with a 3 percent solution of sulfuric acid at room temperature for 15 min., then it is washed with water and immersed in a 5 percent solution of cupric acetate at room temperature and with the length of bath being 50, for 2 hours, with subsequent washing with cold water and drying.

The content of copper in the specimens is 1.0–1.2 wt. percent. The fibre acquires a brown color. The color is fast to the action of ultraviolet radiation. The strength of the fibre after 30 days of keeping in soil amounts to 95 percent of the initial value.

EXAMPLE 10.

Five parts by weight of undelustred viscose fabric containing 27 percent of graft polyacrylonitrile are treated with an aqueous solution comprising 20 percent of sodium sulfide and 10 percent of cupric acetate at 70° C for 5 min., whereupon the fabric is wrung to 100 percent. Then the fabric is steamed at 100°–105° C during 10 min. Then the fabric is treated with 3 percent sulfuric acid, washed with running water and dried. The content of copper in the specimen is 1.5–1.7 wt. percent.

EXAMPLE 11

Five parts by weight of "nitron" fibres (polyacrylonitrile) are treated with an 8 percent solution of sodium sulfide at a temperature of 70°–75° C for 4 hours with pH = 7–7.5, maintained by introducing monobasic sodium phosphate, the length of bath being 50. The treatment being over, the specimen is removed and washed with a 3 percent solution of sulfuric acid during 15 min., and then with cold water.

The content of sulfur in the obtained specimen is 1.0–1.2 wt. percent. The specimen acquires a yellow color.

What is claimed is:

1. A method of dyeing a polymer containing nitrile groups and selected from the group consisting of polyacrylonitrile, cyanoethylated cellulose, cyanoethylated polyvinyl alcohol, and graft copolymers of polyacrylonitrile with cellulose, polyvinyl alcohol or polyamide polymers in a color ranging from yellow to brown which consists essentially of treating said polymer with a solution consisting essentially of a substantially neutral aqueous solution containing at least 3 percent by weight of a sulfur compound selected from the group consisting of hydrosulfuric acid, ammonium sulfide and alkali metal sulfides so as to introduce sulfur in the form of sulfhydryl groups into the polymer and then treating the sulfhydrated polymer with a weakly acidic medium having a pH of 4 to 6.

2. A method as claimed in claim 1, wherein the sulfur compound is sodium sulfide.

3. A method as claimed in claim 1, wherein the treatment of the polymer with the aqueous solution of the sulfur compound is carried out in a neutral medium at a pH of 7–7.5 which is maintained by the introduction of a phosphate buffer.

4. A method as claimed in claim 3, wherein the phosphate buffer is monobasic potassium phosphate.

5. A method as claimed in claim 1, wherein the treatment of the polymer with the aqueous solution of the sulfur compound is carried out at a temperature of 60–100° C.

6. A method as claimed in claim 5, wherein the tratment with said solutions is effected at a temperature of 70°–80° C.

7. A method as claimed in claim 1 wherein sulfur is introduced into the polymer in an amount not less than 2.5 wt. percent, thereby imparting a yellow to orange color to the polymer.

8. A method as claimed in claim 1 wherein sulfur is introduced into the polymer in an amount not less than 8 wt percent, thereby imparting an orange to brown color to the polymer.

9. A method as claimed in claim 1 wherein the weakly acidic medium is a 3 percent aqueous solution of sulfuric acid.

10. A method of dyeing a polymer containing nitrile groups and selected from the group consisting of polyacrylonitrile, cyanoethylated cellulose, cyanoethylated polyvinyl alcohol, and graft polymers of polyacrylonitrile with cellulose, polyvinyl alcohol or polyamide polymers in a color ranging from yellow to brown which consists essentially of treating said polymer with a solution consisting essentially of a substantiallly neutral aqueous solution containing at least 3 percent by weight of a sulfur compound selected from the group consisting of hydrosulfuric acid, ammonium sulfide and alkali metal sulfides so as to introduce sulfur in the form of sulfhydryl groups into the polymer and then treating the sulfhydrated polymer with a weakly acidic medium having a pH of 4 to 6, followed by treating the dyed polymer with steam at a temperature of 100°–105° C.

11. A method of dyeing a polymer containing nitrile groups and selected from the group consisting of polyacrylonitrile, cyanoethylated cellulose, cyanoethylated polyvinyl alcohol, and graft copolymers of polyacrylonitrile with cellulose, polyvinyl alcohol or polyamide polymers in a color ranging from yellow to brown which consists essentially of treating said polymer with a solution consisting essentially of a substantially neutral aqueous solution containing at least 3 percent by weight of a sulfur compound selected from the group consisting of hydrosulfuric acid, ammonium sulfide and alkali metal sulfides so as to introduce sulfur in the form of sulfhydryl groups into the polymer and then treating the sulfhydrated polymer with a weakly acidic medium having a pH of 4 to 6 followed by treating the dyed polymer with an aqueous solution of a salt of a metal selected from the group consisting of copper and nickel.

12. A method as claimed in claim 11, wherein the salt is a salt of bivalent copper.

* * * * *